US010575165B2

(12) United States Patent
Keller et al.

(10) Patent No.: US 10,575,165 B2
(45) Date of Patent: Feb. 25, 2020

(54) ROUTING BASED ON ACCESS POINT NAME (APN) INFORMATION

(71) Applicant: Telefonaktiebolaget LM Ericsson (publ), Stockholm (SE)

(72) Inventors: Ralf Keller, Würselen (DE); Ann-Christine Sander, Göteborg (SE); Ivo Sedlacek, Hovorcovice (CZ)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 67 days.

(21) Appl. No.: 15/500,720

(22) PCT Filed: Sep. 1, 2014

(86) PCT No.: PCT/EP2014/068524
§ 371 (c)(1),
(2) Date: Jan. 31, 2017

(87) PCT Pub. No.: WO2016/034199
PCT Pub. Date: Mar. 10, 2016

(65) Prior Publication Data
US 2017/0223523 A1 Aug. 3, 2017

(51) Int. Cl.
*H04W 4/00* (2018.01)
*H04W 8/08* (2009.01)
(Continued)

(52) U.S. Cl.
CPC ............ *H04W 8/082* (2013.01); *H04W 8/20* (2013.01); *H04W 48/08* (2013.01); *H04W 76/10* (2018.02); *H04W 48/17* (2013.01)

(58) Field of Classification Search
CPC .................. H04W 48/18; H04W 8/183
See application file for complete search history.

(56) References Cited

U.S. PATENT DOCUMENTS 9,019,974 B2* 4/2015 McCann ............... H04W 76/12
370/401
9,185,545 B2* 11/2015 Yeoum ................. H04W 8/082
(Continued)

OTHER PUBLICATIONS

QUALCOMM Europe; "Comparison of the three scenarios for IMS Local Breakout"; 3GPP TSG SA WG2 Meeting #62, TD S2-080325; Marina Del Rey, California, CA, USA; Jan. 14-18, 2008; pp. 1-3.
(Continued)

*Primary Examiner* — Shantell L Heiber
(74) *Attorney, Agent, or Firm* — Sage Patent Group

(57) ABSTRACT

It is desirable for a user equipment (UE) 100 to be able to determine if connecting using an access point name (APN) would result in a home routed or local breakout (LBO) routed connection. With this information, the UE can decide which APNs to use for packet data network (PDN) connections e.g. to ensure that the bearers on the PDN connection are able to carry certain services which are incompatible with home routing or LBO routing, or to ensure that charging is carried out by the home or visited network, as desired (e.g. to avoid roaming fees). Alternatively, the user can be presented with the option of home routing or LBO routing for a connection. In order to provide this information to the UE, modified signalling is proposed, among others, by means of a method of operating a mobility management entity (MME) 200 in a mobile telecommunications network. The MME provides, S103, to a UE a mapping between an APN that has been or may be used by the UE to establish a connection to a PGN gateway and a routing type associated with the connection. The routing type is one of home routing and local breakout, LBO, routing. The UE is roaming in a geographical area controlled by the MME.

22 Claims, 4 Drawing Sheets

(51) Int. Cl.
H04W 8/20 (2009.01)
H04W 76/10 (2018.01)
H04W 48/08 (2009.01)
H04W 48/00 (2009.01)

(56) References Cited

U.S. PATENT DOCUMENTS

| | | | | |
|---|---|---|---|---|
| 2009/0316656 A1* | 12/2009 | Zhao | H04W 28/22 |
| | | | 370/331 |
| 2011/0007748 A1* | 1/2011 | Yin | H04L 45/00 |
| | | | 370/401 |
| 2012/0044949 A1* | 2/2012 | Velev | H04W 8/082 |
| | | | 370/401 |
| 2012/0046058 A1* | 2/2012 | Vesterinen | H04W 8/082 |
| | | | 455/509 |
| 2012/0057463 A1* | 3/2012 | Hurtta | H04L 12/5692 |
| | | | 370/236 |
| 2012/0201215 A1* | 8/2012 | Shaheen | H04W 4/00 |
| | | | 370/329 |
| 2013/0170473 A1* | 7/2013 | Liu | H04W 28/24 |
| | | | 370/331 |
| 2013/0208661 A1* | 8/2013 | Nylander | H04W 48/17 |
| | | | 370/328 |

OTHER PUBLICATIONS

Marvell; "On the scenario of both home-routed and local breakout IMS sessions"; 3GPP TSG SA WG2 Meeting #62, TD S2-080512; Marina Del Rey, California, CA, USA; Jan. 14-18, 2008; pp. 1-2.

* cited by examiner

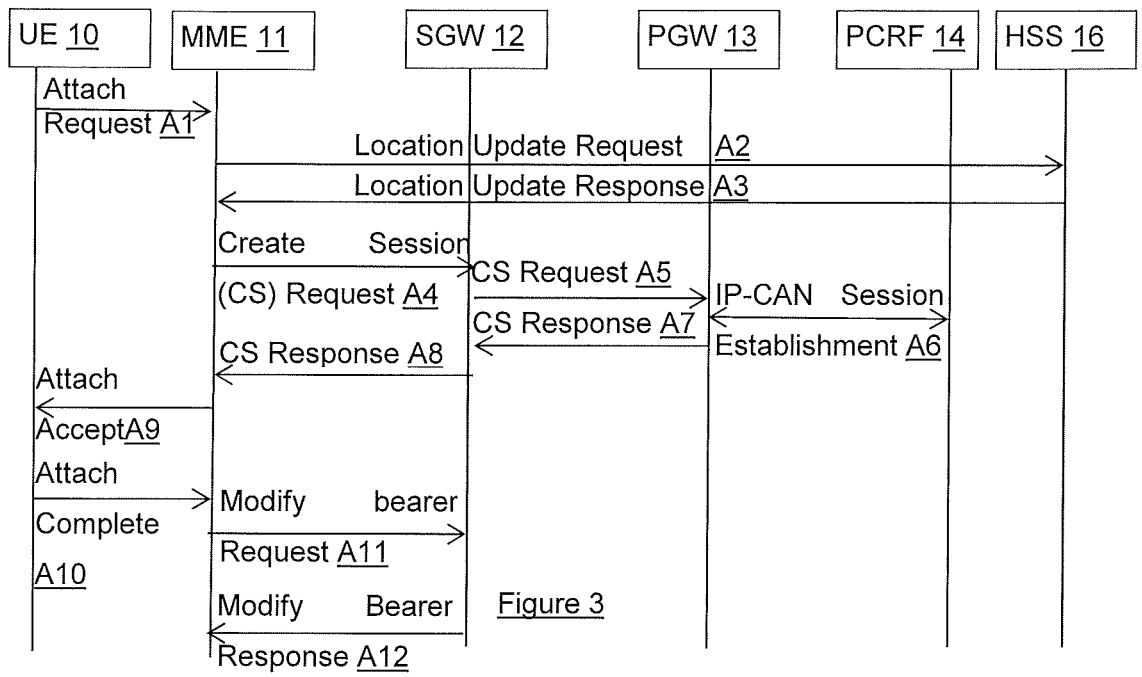
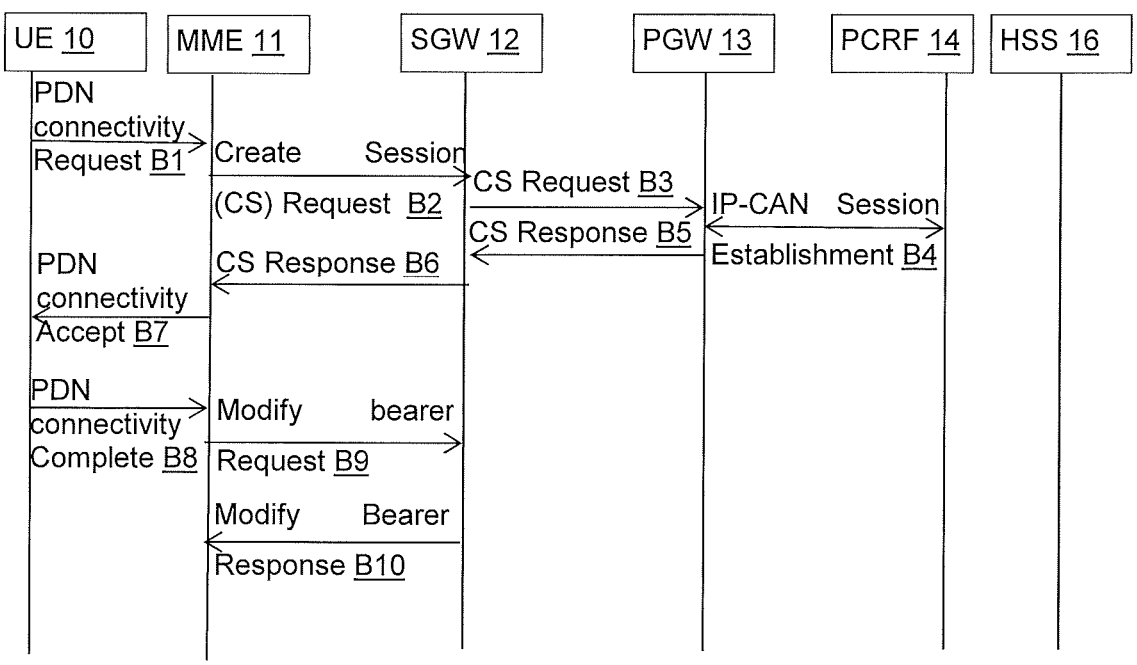
Figure 4

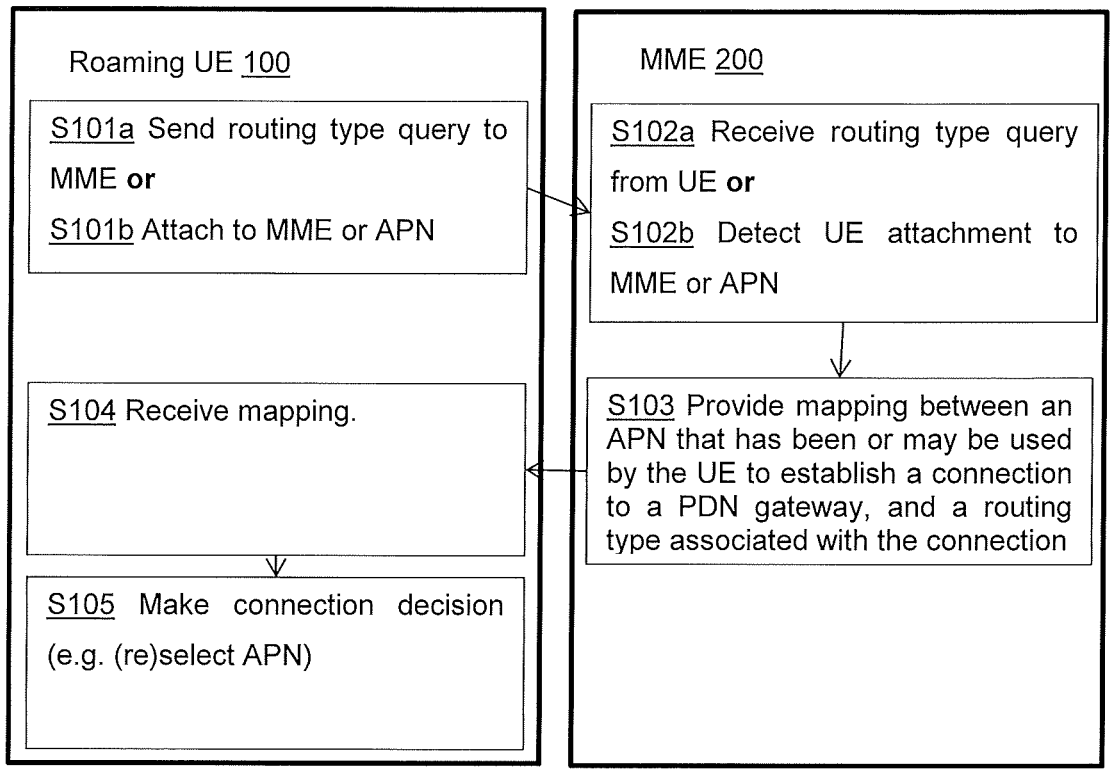
Figure 8
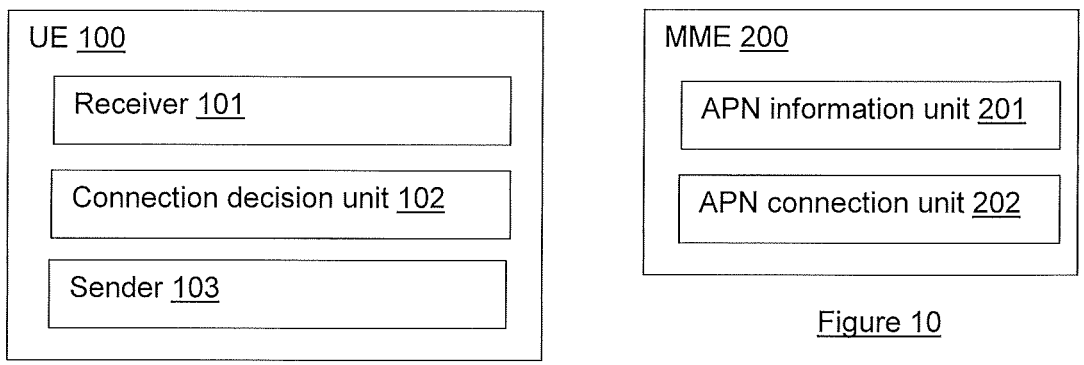
Figure 9
Figure 10

ROUTING BASED ON ACCESS POINT NAME (APN) INFORMATION

TECHNICAL FIELD

The present invention relates to the provision of access point name (APN) information to a user equipment (UE) in a telecommunications network. In particular, the invention relates to providing the UE with information relating to the routing of the connection associated with the APN.

BACKGROUND

In mobile telecommunications networks, a user equipment (UE) may access services when outside of the geographical coverage of its home network by roaming to a visited network which has coverage in the location of the UE. This is achieved by having agreements between the home network and visited network to allow data and control signalling to pass between the networks.

For packet networks, there are two classes of roaming setups. FIG. 1 shows the nodes involved in local breakout (LBO) routing. The UE 10 is attached to a Mobility Management Entity (MME) 11, which handles all bearer and PDN connection setups for the UE. The MME 11 communicates with the HSS 16 of the home network in order to retrieve subscriber data for the UE 10. For each PDN connection, the UE is attached to a Signalling Gateway (SGW) 12, and a packet gateway (PGW). In local breakout (LBO) routing, PGW 13v and Policy Charging Rules Function (PCRF) 14v of the visited network are used, and control information is sent to the PCRF 14h of the home network (e.g. for charging and QoS purposes). Provided the service being accessed is not on the home network, no data traffic needs to travel across the home network.

The other roaming setup is home routing, as shown in FIG. 2. The UE 10 is attached to the MME 11 and SGW 12 as before. In this case, a tunnel is formed between the UE 10 and the PGW 13h of the home network. The home PGW 13h and home PCRF 14h then handle traffic for the UE 10.

A single roaming UE may use both types of routing, as multiple PDN connections may be established and each may be routed differently. For example, HTTP traffic may be home routed, while Voice over IP (VoIP) traffic may be routed via LBO.

There are advantages and disadvantages to both types of routing. For example, in LBO routing, a secure tunnel cannot be set up between the UE and the home network (as at least some nodes in the visited network need access to the packets), which prevents the use of certain services. When voice calls (e.g. over VoLTE) are home routed, it is not possible to have a seamless handover to circuit switched networks if the user moves into an area covered by legacy equipment. Also, home routed services and LBO routed services may be charged differently by the home network and/or the visited network.

LBO also allows for Alternative Roaming Providers (ARP), where a roaming provider which is not the preferred routing provider for a home network may still act as a visited network, with the roaming charging rates being determined by the ARP rather than the preferred visited network. An example of this is the proposed "euinternet" ARP.

Each gateway available to the UE is identified by an Access Point Name (APN). When the UE initially attaches to the network, it will be connected to the gateway associated with the default APN for the network, or with the gateway associated with an APN specified by the UE. For each subsequent PDN connection established by the UE, the UE may specify an APN, and the gateway associated with that APN will be used for the PDN connection. The APN details may be programmed into the UE (e.g. by the user), or configured in the UE by the network after the UE initially attaches to the network.

The process of attachment to the default APN is shown in FIG. 3. The UE 10 sends an Attach Request A1 to a Mobility Management Entity (MME) 11. The MME 11 then sends a Location Update Request A2 to a Home Subscriber Service (HSS) 16, which updates the location information of the UE and sends a Location Update Ack A3 to the MME 11. The MME 11 then sends a Create Session Request A4 to the SGW 12, specifying the default APN. The SGW 12 determines that the default APN is associated with the PGW 13, and forwards the Create Session Request A5 to the PGW 14. The PGW 13 and PCRF 14 communicate to establish the IP-CAN session A6. Once the session is established, a Create Session Response is passed from the PGW 13 to the SGW 12 (A7), and then from the SGW 12 to the MME 13 (A8). The MME 11 sends an Attach Accept A9 containing the details of the session to the UE 10, which responds with an Attach Complete A10, containing any session modifications required. The modifications are communicated to the SGW 12 by the MME 11 in a Modify Bearer Request (A11) and Modify Bearer Response (A12). The same process may be used to establish a first PDN connection to an APN other than the default APN, where the UE specifies the APN to be used in the Attach Request.

The process of establishing a subsequent PDN connection is shown in FIG. 4. The process is equivalent to that in FIG. 3, except that a Location update is not provided to the HSS 16, the Attach Request/Accept/Complete A1/A9/A10 is replaced by a PDN connectivity request/accept/complete B1/B7/B8 and the PDN connectivity request B1 may specify an APN to be connected to (which is then included in the Create Session Request B2). Signals B3 to B10 are equivalent to A5 to A1t respectively.

At present, a UE cannot reliably determine whether connecting using a specific APN would result in a home routed or LBO routed connection. The APN itself may contain some contextual clues (e.g. an APN including the name of the UE's home network operator is likely to be home routed), but there is no requirement for the APN to include such information. The UE could look up the IP address associated with the APN, and determine which operator the IP address belongs to, but this would require a large amount of extra signalling.

SUMMARY

According to a first aspect, there is provided a method of operating an MME in a telecommunications network. The MME provides to a UE a mapping between an APN that has been or may be used by the UE to establish a connection to a PGW and a routing type associated with the connection. The routing type is one of home routing and local breakout, LBO, routing. The UE is roaming in a geographical area controlled by the MME.

According to a second aspect, there is provided a method of operating a UE in a telecommunications network. The UE receives, from an MME, a mapping between an APN that has been or may be used by the UE to establish a connection to a PGW and a routing type associated with the connection. The routing type is one of home routing and local breakout, LBO, routing. The UE makes a connection decision based on the mapping. The UE is roaming in a geographical area controlled by the MME.

According to a third aspect, there is provided apparatus configured to operate as an MME in a telecommunications network. The apparatus comprises an APN information unit. The APN information unit is configured to provide, to a UE, a mapping between an APN that has been or may be used by the UE to establish a connection to a PGW, and a routing type associated with the connection; wherein the UE is roaming in a geographical area controlled by the MME. The routing type is one of home routing and local breakout, LBO, routing.

According to a fourth aspect, there is provided apparatus configured to operate as a UE in a telecommunications network. The apparatus comprises a receiver and an connection decision unit. The receiver is configured to receive, from an MME, when the UE is roaming in a geographical area controlled by the MME, a mapping between an APN that has been or may be used by the UE to establish a connection to a PGW and a routing type associated with the connection. The routing type is one of home routing and local breakout, LBO, routing. The connection decision unit is configured to make a connection decision based on said mapping.

According to a fifth aspect, there is provided a computer program comprising computer readable code which when run on an apparatus causes the apparatus to perform a method according to the first or second aspect.

BRIEF DESCRIPTION OF THE DRAWINGS

FIG. 3 is a signalling diagram showing an initial attachment to the network by a UE;

FIG. 4 is a signalling diagram showing PDN connection establishment by a UE;

FIG. 8 is a flowchart of a method according to an embodiment;

FIG. 9 is a schematic diagram of a UE according to an embodiment;

FIG. 10 is a schematic diagram of an MME according to an embodiment.

DETAILED DESCRIPTION

It is desirable for the UE to be able to determine if connecting using an APN would result in a home routed or LBO routed connection. With this information, the UE can decide which APNs to use for PDN connections e.g. to ensure that the bearers on the PDN connection are able to carry certain services which are incompatible with home routing or LBO routing, or to ensure that charging is carried out by the home or visited network, as desired (e.g. to avoid roaming fees). Alternatively, the user can be presented with the option of home routing or LBO routing for a connection.

In order to provide this information to the UE, modified signalling is proposed below. This signalling provides the UE with a mapping between one or more APNs and the routing types which would result from connection to each APN. Embodiments are presented which provide this mapping to the UE within existing signalling. Alternatively, the mapping may be provided to the UE within new signalling (i.e. within a message that would not be sent during conventional operation).

There are four main embodiments considered below:

In the first embodiment, the mapping is provided to the UE during PDN connection establishment, and the mapping relates at least to the APN used during the PDN connection establishment.

In the second embodiment, the mapping is provided to the UE during initial attach to a mobility management entity, MME, and relates to one or more of the APNs available to the UE.

In the third embodiment, the mapping is requested by the UE during or subsequent to initial attach to the MME.

In the fourth embodiment, the mapping is pre-configured into the UE, e.g. into the USIM Each embodiment involves a UE 100 and a MME 200 which are modified to implement the embodiment. No modifications are required to other network nodes.

Figure 1:
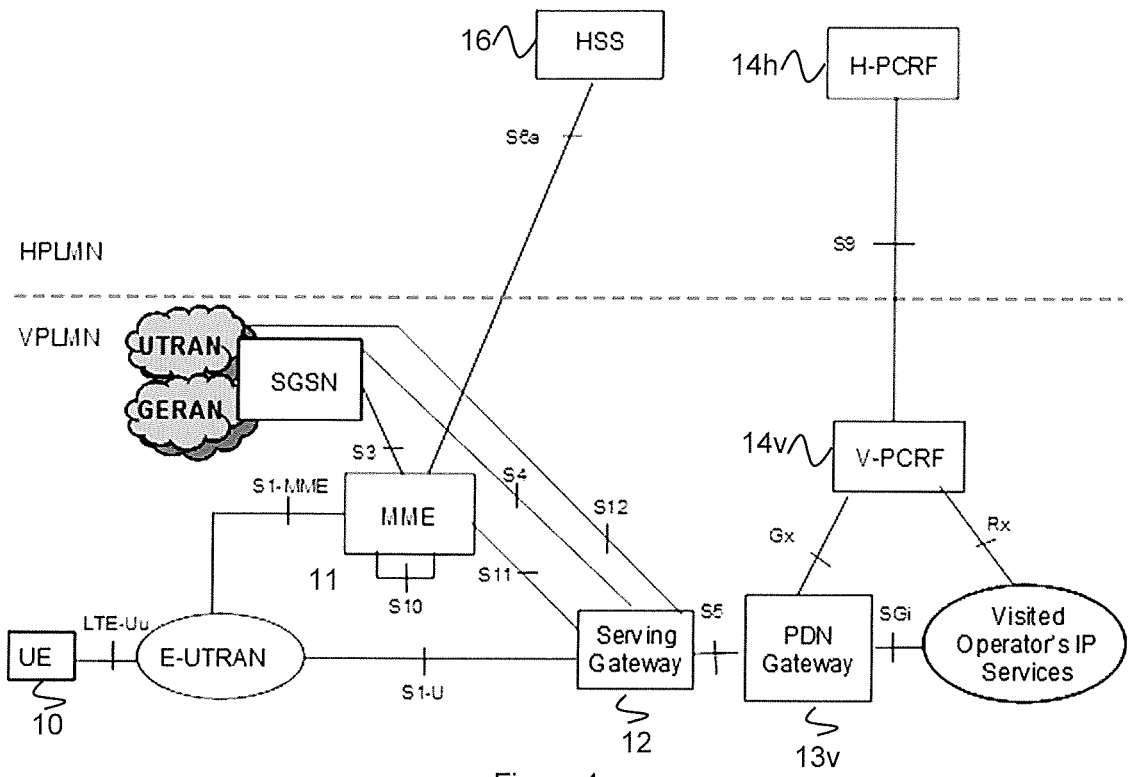
FIG. 1 is a network diagram showing a local breakout routed connection.
Figure 2:
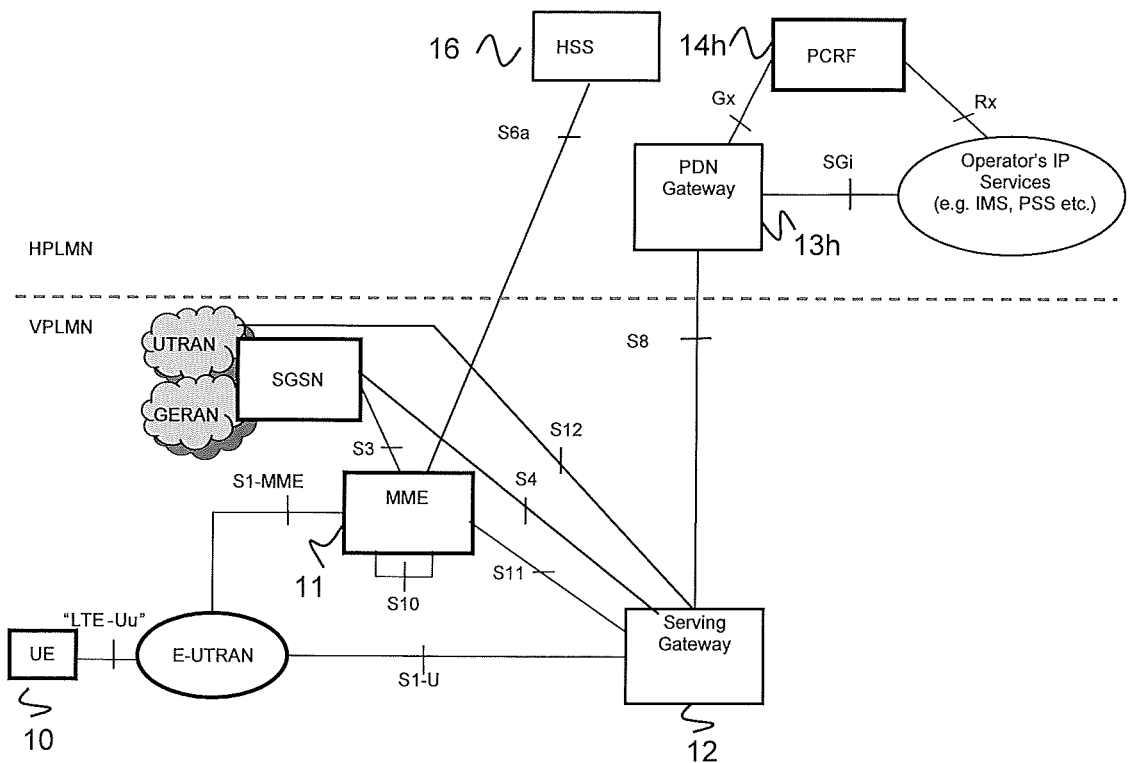
FIG. 2 is a network diagram showing a home routed connection.
Figure 5:
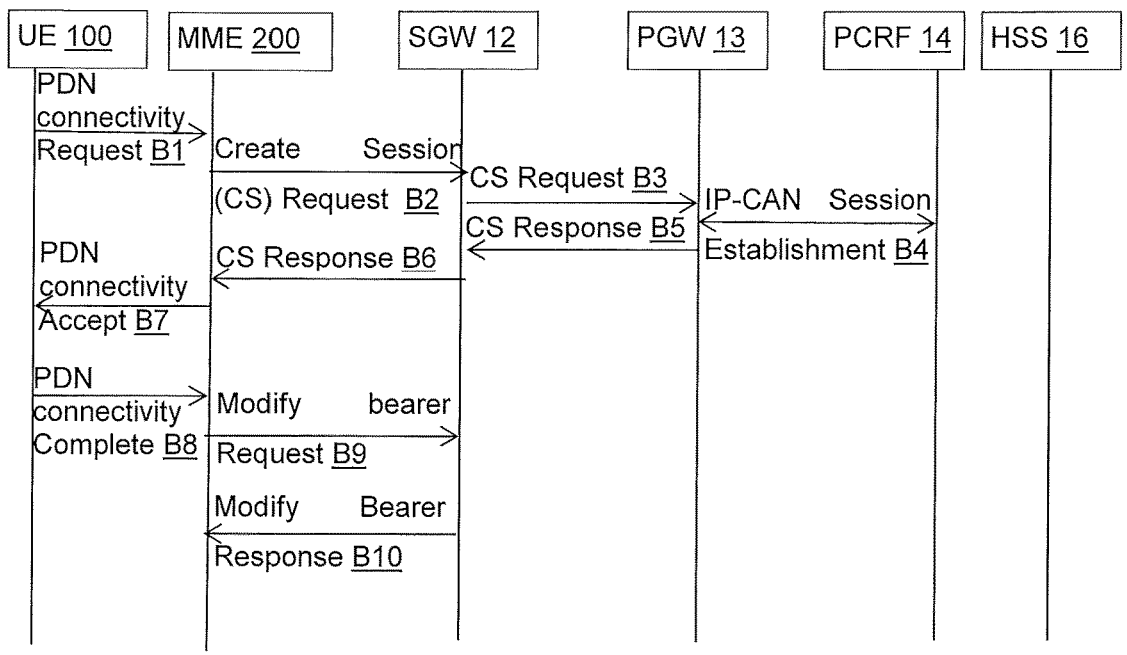
FIG. 5 is a signalling diagram of a method according to an embodiment.

Turning to the first embodiment, the mapping is provided during PDN connection establishment as shown in FIG. 5. This is equivalent to the signalling shown in FIG. 4, except as noted below. The mapping may be provided to the UE by the MME in the PDN connectivity accept message C7. This may be done each time the UE performs a PDN connection establishment when the UE is in a visited network, or it may only be done if the UE requests such. Alternatively, the UE could request the mapping in a Ciphered Options Response message (not shown in the figures). The mapping will relate to at least the APN which the UE is connecting to (as specified in the PDN connectivity request), and may also relate to other APNs, such as APNs specified by the UE.

The request for a mapping from the UE and/or the other APNs specified by the UE may be included in new fields of the PDN connectivity request message C1. Alternatively, they may be included in a new message sent by the UE during PDN connection establishment.

This information may be used by the UE to inform the user of the charging rules which are in effect for the session, or to request an additional PDN connection if the routing is of an undesirable type.

Figure 6:
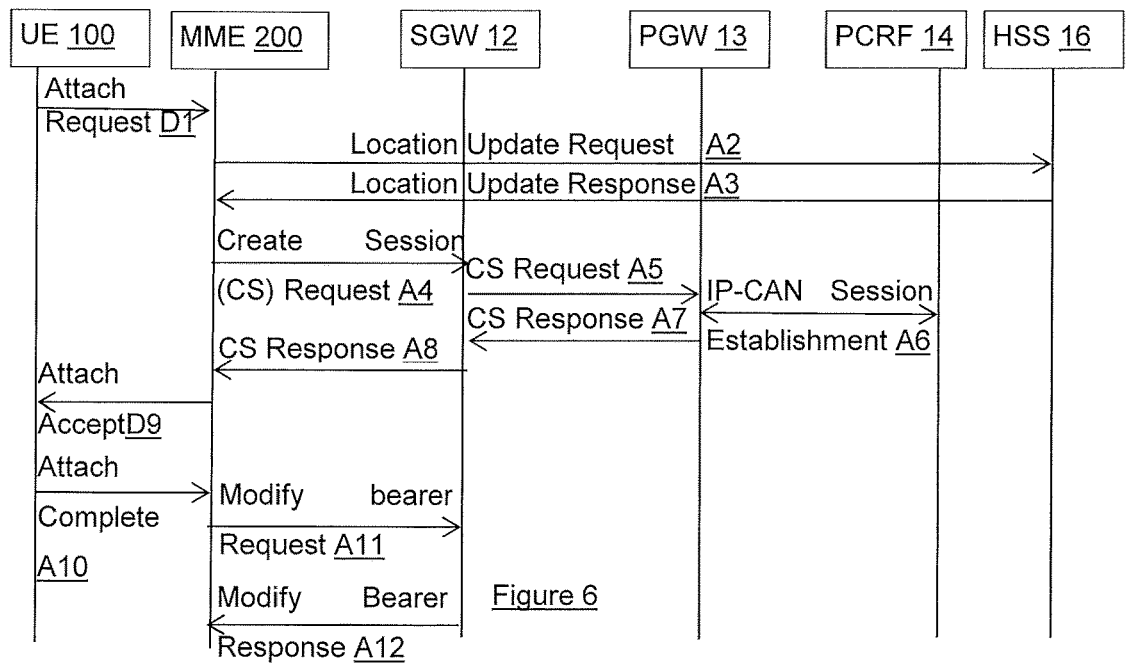
FIG. 6 is a signalling diagram of a method according to an embodiment.

Considering the second embodiment, the mapping is provided during initial attachment of the UE to the MME as shown in FIG. 6. This is equivalent to the signalling shown in FIG. 3, except as noted below. The mapping is provided to the UE by the MME in the Attach Accept message D9. This may be done each time the UE performs an initial attachment to an MME when the UE is in a visited network, or it may only be done if the UE requests such a mapping. The mapping may relate to all or a subset of the APNs available to the UE, it may relate to a set of APNs specified by the UE, or it may relate to one or more preferred APNs of each routing type (e.g. a preferred home routed APN and a preferred LBO routed APN).

The request for a mapping from the UE and/or the APNs specified by the UE may be included in new fields of the Attach Request message C1. Alternatively, they may be included in a Ciphered Options Response sent by the UE. As a further alternative, they may be included in a new message sent by the UE during PDN connection establishment.

This information allows the UE to choose for later PDN connections whether the PDN connection will be home routed or LBO routed. This decision may be presented to the user (e.g. to allow the user to choose between two sets of charging rules), or it may be made on a service specific basis (e.g. to avoid using home routed APNs for services which are only available with LBO routing and vice versa).

Figure 7:
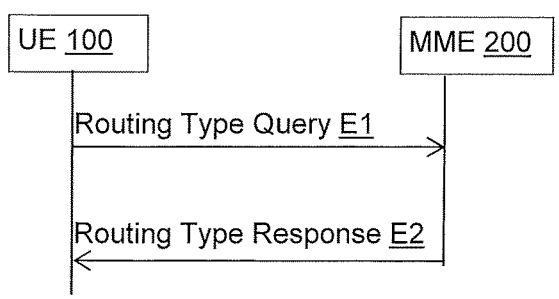
FIG. 7 is a signalling diagram of a method according to an embodiment.

Considering the third embodiment, the mapping is provided in response to receiving a routing type query from the UE. The signalling for this embodiment is shown in FIG. 7. The routing type query E1 may be included within some other message sent from the UE to the MME, or it may be a new message. The query may specify a set of APNs or a single APN for which routing information is desired, and if so the mapping will include information on at least those APNs. The response is provided within a routing type response E2, which may be included within some other message sent from the UE to the MME, or may be a new message.

Considering the fourth embodiment, the mapping may be provided to the UE prior to the initial attachment to the MME, for example it may be provided in the USIM of the UE. This embodiment requires no extra signalling, but it does not allow APNs to be reassigned, or dynamically assigned to home routed and LBO routed PGWs, since UEs which are unaware of the reassignment would incorrectly conclude whether the APN is home routed or LBO routed.

The mapping may take various forms. In one example, the mapping may be a list of APNs, specifying for each APN whether it is home routed or LBO routed. This may take the form of a Boolean variable, with "true" indicating home routing, and "false" indicating LBO routing, or vice versa. In a further example, the mapping may comprise two lists, with one list containing APNs which are home routed, and one list containing APNs which are LBO routed. In a further example, the mapping may be a single list of APNs, all of which have one routing type (e.g. all of which are home routed), and it is assumed that any APNs not on the list have the other routing type.

The UE may use the information within the mapping in various ways.

The UE may inform the user which routing type is used while roaming. This may be of particular use if there are differing charging rules for LBO and home routing. The user may be able to block the use of either type of APN.

The UE may select a certain routing type e.g. on the basis of user preferences, or for certain services. Or the UE may use existing connections for certain services, e.g. the UE may use the IMS APN for XCAP/Ut and/or for IMAP/HTTP/XCAP if it determines that the IMS APN is home routed (XCAP requests sent over an LBO routed connection will not reach the home network). This avoids the need for special solutions when the user has turned mobile data off, and the internet APN (usually off when data is off) is configured as an APN for XCAP.

The UE may decide to use alternative services in some circumstances, e.g. the UE may decide to the RCS IP Call instead of IR.92/IR.94 video call, even if IMS Voice over PS support is indicated by the MME.

FIG. 8 is a flowchart of a method of providing routing information to the UE. The UE 100 sends a routing type query to the MME (S101a) or attaches to the MME or a PGW represented by an APN (S101b). The MME 200 receives the routing type query (S102a) or detects the attachment of the UE to the MME or PGW (S102b) as appropriate. In response, the MME 200 provides a mapping between an APN that has been or may be used by the UE to establish a connection to a PGW, and a routing type associated with the connection (S103). The UE receives the mapping (S104) and makes a connection decision using the mapping (S105), e.g. selecting or reselecting an APN to connect to on the basis of the routing type associated with the APN in the mapping.

FIG. 9 is a schematic of a UE 100 according to an embodiment. The UE 100 comprises a receiver 101 and a connection decision unit 102. The receiver is configured to receive, from a mobility management entity, MME, when the UE is roaming in a geographical area controlled by the MME, a mapping between an APN, that has been or may be used by the UE to establish a connection to a PDN gateway, and a routing type associated with the connection, the routing type being one of home routing and LBO routing. The connection decision unit 102 is configured to make a connection decision based on said mapping.

The UE 100 may further comprise a sender 103 configured to send a routing type query to the MME.

FIG. 10 is a schematic diagram of an MME 200 according to an embodiment. The MME comprises an APN information unit 201. The APN information unit is configured to provide, to a user equipment, UE, a mapping between an access point name, APN, that has been or may be used by the UE to establish a connection to a packet data network, PDN, gateway, and a routing type associated with the connection, the routing type being one of home routing and local breakout, LBO, routing; wherein the UE is roaming in a geographical area controlled by the MME.

The MME may also comprise an APN connection unit configured to detect establishment of a connection between the UE and the APN, wherein the APN information unit is configured to provide the mapping in response to said detection by the APN connection unit.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of operating a mobility management entity (MME) in a telecommunications network, the method comprising:
   signaling, to a user equipment (UE), a mapping between an access point name (APN) that has been or may be used by the UE to establish a connection to a packet data network (PDN) gateway, and a routing type associated with the connection;
   wherein the routing type is one of home routing and local breakout (LBO) routing;
   wherein the UE is roaming in a geographical area controlled by the MME; and
   signaling a plurality of such mappings at the same time, each mapping being for a different APN.

2. The method of claim 1, further comprising, prior to the providing the mapping, detecting establishment of a connection between the UE and the APN.

3. The method of claim 2, wherein the mapping is provided within a PDN connectivity accept message sent by the MME during the establishment of a connection between the UE and the APN.

4. The method of claim 1, further comprising receiving a routing type query received from the UE, wherein the mapping is provided in response to receipt of the routing type query.

5. The method of claim 4, wherein the routing type query indicates the APN.

6. The method of claim 1, wherein the providing the mapping comprises sending an Attach Accept message to the UE during attachment of the UE to the MME, the Attach Accept message containing the mapping.

7. A method of operating a user equipment (UE) in a telecommunications network, the method comprising:
  receiving, from a mobility management entity (MME), signaling indicating a mapping between an access point name (APN) that has been or may be used by the UE to establish a connection to a packet data network (PDN) gateway, and a routing type associated with the connection, wherein the routing type is one of home routing and local breakout (LBO) routing;
  receiving signaling comprising a plurality of such mappings at the same time, each mapping being for a different APN; and
  making a connection decision based on the mapping, wherein the connection decision is made based on one or more of the plurality of mappings;
  wherein the UE is roaming in a geographical area controlled by the MME.

8. The method of claim 7, wherein the connection decision comprises selecting one of the APNs for use in establishing a connection for a service.

9. The method of claim 7, further comprising sending a routing type query to the MME.

10. The method of claim 9, wherein the routing type query specifies the APN.

11. An apparatus configured to operate as a mobility management entity (MME) in a telecommunications network, the apparatus comprising:
  processing circuitry;
  memory containing instructions executable by the processing circuitry whereby the MME is operative to:
    signal, to a user equipment (UE), a mapping between an access point name (APN) that has been or may be used by the UE to establish a connection to a packet data network (PDN) gateway, and a routing type associated with the connection;
    wherein the routing type is one of home routing and local breakout (LBO) routing;
    wherein the UE is roaming in a geographical area controlled by the MME; and
    signal a plurality of such mappings at the same time, each mapping being for a different APN.

12. The apparatus of claim 11, wherein the instructions are such that the MME is operable to:
  detect establishment of a connection between the UE and the APN; and
  provide the mapping in response to the detection of the connection between the UE and the APN.

13. The apparatus of claim 12, wherein the instructions are such that the MME is operable to provide the mapping within a PDN connectivity accept message sent by the APN connection unit during the establishment of the connection between the UE and the APN.

14. The apparatus of claim 11, wherein the instructions are such that the MME is operable to receive a routing type query from the UE, and to provide the mapping in response to receiving the routing type query.

15. The apparatus of claim 14, wherein the instructions are such that the MME is operable to identify the APN from the routing type query.

16. The apparatus of claim 11, wherein the instructions are such that the MME is operable to provide the mapping by sending an Attach Accept message to the UE during attachment of the UE to the MME, the Attach Accept message containing the mapping.

17. An apparatus configured to operate as a user equipment (UE) in a telecommunications network, the apparatus comprising:
  a receiver configured to receive, from a mobility management entity (MME), when the UE is roaming in a geographical area controlled by the MME, signaling comprising a mapping between an access point name (APN) that has been or may be used by the UE to establish a connection to a packet data network (PDN) gateway, and a routing type associated with the connection; wherein the routing type is one of home routing and local breakout (LBO) routing;
  receive signaling comprising a plurality of such mappings at the same time, each mapping being for a different APN; and
  processing circuitry configured to make a connection decision based on the mapping, wherein the connection decision is made based on one or more of the plurality of mappings.

18. The apparatus of claim 17, wherein the connection decision comprises selecting one of the APNs for use in establishing a connection for a service.

19. The apparatus of claim 17, further comprising a sender configured to send a routing type query to the MME.

20. The apparatus of claim 19, wherein the routing type query specifies the APN.

21. A non-transitory computer readable recording medium storing a computer program product for controlling operation of a mobility management entity (MME) in a telecommunications network, the computer program product comprising software instructions which, when run on processing circuitry of the MME, causes the MME to:
  signal, to a user equipment (UE), a mapping between an access point name (APN) that has been or may be used by the UE to establish a connection to a packet data network (PDN) gateway, and a routing type associated with the connection;
  wherein the routing type is one of home routing and local breakout (LBO) routing;
  wherein the UE is roaming in a geographical area controlled by the MME; and
  signal a plurality of such mappings at the same time, each mapping being for a different APN.

22. A non-transitory computer readable recording medium storing a computer program product for controlling a user equipment (UE) in a telecommunications network, the computer program product comprising software instructions which, when run on processing circuitry of the UE, causes the UE to:
  receive, from a mobility management entity (MME), signaling comprising a mapping between an access point name (APN) that has been or may be used by the UE to establish a connection to a packet data network (PDN) gateway, and a routing type associated with the connection, wherein the routing type is one of home routing and local breakout (LBO) routing;
  receive signaling comprising a plurality of such mappings at the same time, each mapping being for a different APN; and make a connection decision based on the mapping, wherein the connection decision is made based on one or more of the plurality of mappings;

wherein the UE is roaming in a geographical area controlled by the MME.

* * * * *